(12) United States Patent
Rao et al.

(10) Patent No.: US 9,037,539 B2
(45) Date of Patent: *May 19, 2015

(54) DATA SYNCHRONIZATION

(71) Applicant: International Business Machines Corporation, Armonk, NY (US)

(72) Inventors: Anuradha Rao, Hopewell Junction, NY (US); Alain Le Floc'h, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 87 days.

This patent is subject to a terminal disclaimer.

(21) Appl. No.: 13/654,000

(22) Filed: Oct. 17, 2012

(65) Prior Publication Data

US 2013/0041868 A1 Feb. 14, 2013

Related U.S. Application Data

(63) Continuation of application No. 13/187,092, filed on Jul. 20, 2011.

(51) Int. Cl.
G06F 7/00 (2006.01)
G06F 17/30 (2006.01)

(52) U.S. Cl.
CPC .................. *G06F 17/30176* (2013.01)

(58) Field of Classification Search
None
See application file for complete search history.

(56) References Cited

U.S. PATENT DOCUMENTS

| | | | |
|---|---|---|---|
| 5,418,728 A | | 5/1995 | Yada |
| 5,815,683 A | * | 9/1998 | Vogler .......................... 709/217 |
| 5,987,510 A | | 11/1999 | Imai et al. |
| 6,088,625 A | * | 7/2000 | Kellstrom, Jr. ................. 700/97 |
| 6,256,549 B1 | | 7/2001 | Romero et al. |
| 6,526,574 B1 | * | 2/2003 | Jones ........................... 717/168 |
| 6,842,770 B1 | * | 1/2005 | Serlet et al. ................... 709/203 |
| 6,999,965 B1 | * | 2/2006 | Cesarotti et al. ...................... 1/1 |
| 7,283,135 B1 | | 10/2007 | Cote et al. |
| 7,373,406 B2 | * | 5/2008 | Jones et al. .................... 709/226 |
| 7,627,634 B2 | * | 12/2009 | Hein ............................. 709/206 |
| 2003/0120685 A1 | * | 6/2003 | Duncombe et al. ........... 707/200 |
| 2003/0163605 A1 | * | 8/2003 | Abercrombie et al. ....... 709/332 |
| 2005/0216524 A1 | * | 9/2005 | Gomes et al. ................. 707/201 |
| 2006/0123010 A1 | | 6/2006 | Landry et al. |
| 2006/0129616 A1 | * | 6/2006 | Chen ............................ 707/204 |
| 2006/0155776 A1 | * | 7/2006 | Aust ............................. 707/201 |

* cited by examiner

*Primary Examiner* — Ehichioya Fred
*Assistant Examiner* — Hasanul Mobin
(74) *Attorney, Agent, or Firm* — Cantor Colburn LLP; Steven Chiu

(57) ABSTRACT

A computer program product is provided. The computer program product includes a tangible storage medium readable by a processing circuit and on which instructions are stored for execution by the processing circuit for performing a method. The method includes, upon receipt of a command relating to a file stored at a remote location, synchronizing the file between the remote location and a local device, determining whether a list of files linked to the file is stored in the local device, and, in an event the list is stored in the local device, synchronizing the files included in the list between the remote location and the local device.

6 Claims, 5 Drawing Sheets

DATA SYNCHRONIZATION

CROSS REFERENCE TO RELATED APPLICATION

This application is a continuation of and claims the benefit of priority to U.S. application Ser. No. 13/187,092, which was filed on Jul. 20, 2011. The entire contents of U.S. application Ser. No. 13/187,092 are incorporated herein by reference.

BACKGROUND

The present invention relates to data synchronization and, more particularly, to data synchronization that reduces network traffic.

Mechanical designers working concurrently with other designers at various locations are often required to download large amounts of data (GB) from a centralized data server to their local computers. Where this data is, for example, Mechanical Computer Aided Design (MCAD) data, the data can be made up of thousands of files, some of which may be very large (i.e., on the order of gigabytes), which are wholly or partially linked (i.e., as in assembly files pointing to parts or other sub-assemblies of a large apparatus).

To be sure that each designer uses the latest version of the files, the same files are downloaded each time a designer intends to make a change even if nothing has changed on many of the files. That is, if a particular designer wishes to make a minor change to one small file within MCAD data including thousands of files occupying 5 gigabytes of memory, the designer must first download the entire store of MCAD data prior to making the change. This leads to increased network traffic, data duplication, increased power consumption, deterioration of data integrity and decreased designer productivity.

Current solutions to these problems involve ftp (file transfer protocol) or synchronization programs to copy or synchronize files from one system to another. In these cases, files to be copied or synchronized are either selected individually or multi-selected using search criteria based on file name, extension, modification dates or location. Such methods are, however, not refined for those instances where the files to be copied or synchronized have links to other files such as in the case of MCAD data for assemblies where files must be selected not only based on the criteria listed above but also using links between files or Bills of Material (BOM). Since links between MCAD files or BOM are unknown to ftp programs, users must manually gather the files in a folder for all the components needed for a CAD assembly and then synchronize the folder in a process that can be time consuming and subject to errors or download the entire contents of the MCAD data.

SUMMARY

According to an aspect of the present invention, a computer program product is provided and includes a tangible storage medium readable by a processing circuit and on which instructions are stored for execution by the processing circuit for performing a method. The method includes, upon receipt of a command relating to a file stored at a remote location, synchronizing the file between the remote location and a local device, determining whether a list of files linked to the file is stored in the local device, and, in an event the list is stored in the local device, synchronizing the files included in the list between the remote location and the local device.

According to another aspect of the present invention, a method is provided. The method includes, upon receipt of a command relating to a file stored at a remote location, synchronizing the file between the remote location and a local device, determining whether a list of files linked to the file is stored in the local device, and, in an event the list is stored in the local device, synchronizing the files included in the list between the remote location and the local device.

According to yet another aspect of the present invention, a system is provided. The system includes a processing circuit configured to perform a method. The method includes, upon receipt of a command relating to a file stored at a remote location, synchronizing the file between the remote location and a local device, determining whether a list of files linked to the file is stored in the local device, and, in an event the list is stored in the local device, synchronizing the files included in the list between the remote location and the local device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

A method of data synchronization is provided that simplifies data transfer of, for example, linked files of a Mechanical Computer Aided Design (MCAD) assembly where the transfer is from, for example, a distributed file system where the data resides, such as a remote server or location, to a local device, such as a user's workstation. In the exemplary case of the MCAD assembly, the MCAD assembly files can be located in multiple folders on the remote location but there is no need to install additional software in the remote location. Instead, the enhanced synchronizer program and the MCAD application that will be used to open the assembly are required on only the user's workstation.

After defining the settings of the synchronization (this can be done once or multiple times), the user selects a top level MCAD assembly file(s) and launches the synchronization Links between MCAD files are extracted automatically on the user's workstation and utilized to identify other MCAD files that will also be synchronized. The proposed solution reduces network traffic by minimizing the data transferred with each update thereby leading to energy efficiency. It also eliminates the manual process of gathering and duplicating all the files needed for an assembly before being copied with a standard synchronizer or file transfer program (ftp).

Figure 1:
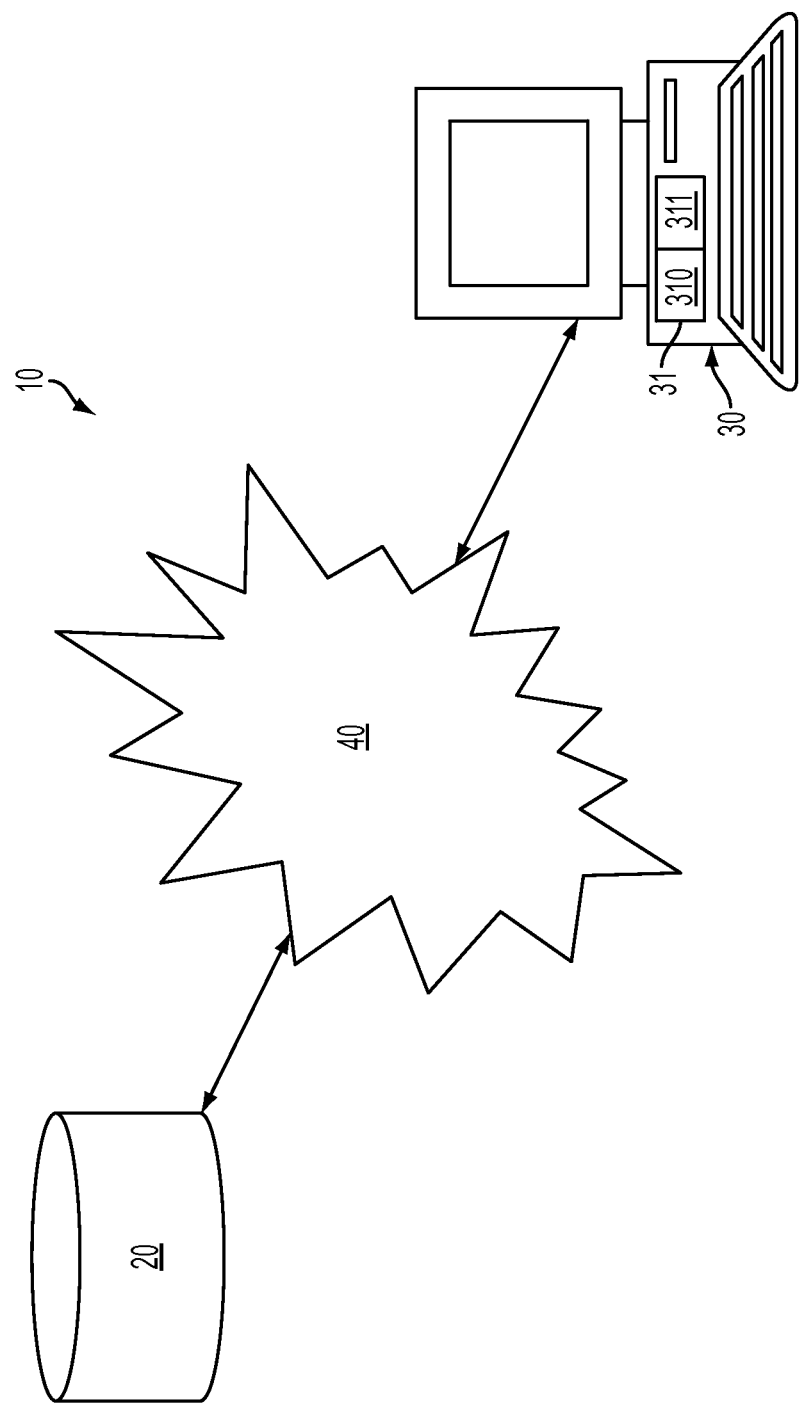
FIG. 1 is a schematic diagram of a computing system.

With reference to FIG. 1, a computing system 10 is provided. The system 10 includes a remote device 20, a local device 30 and a network 40. The remote device 20 may be, for example, a remote server. The local device 30 may be a user workstation or any other user accessible computing device. The network 40 permits the local device 30 and other similar devices to communicate with the remote device 20. In this way, multiple users may have access to files and databases stored at the remote device 20. These files and databases may include MCAD data relating to assemblies and parts thereof or other similarly complex data.

Figure 2:
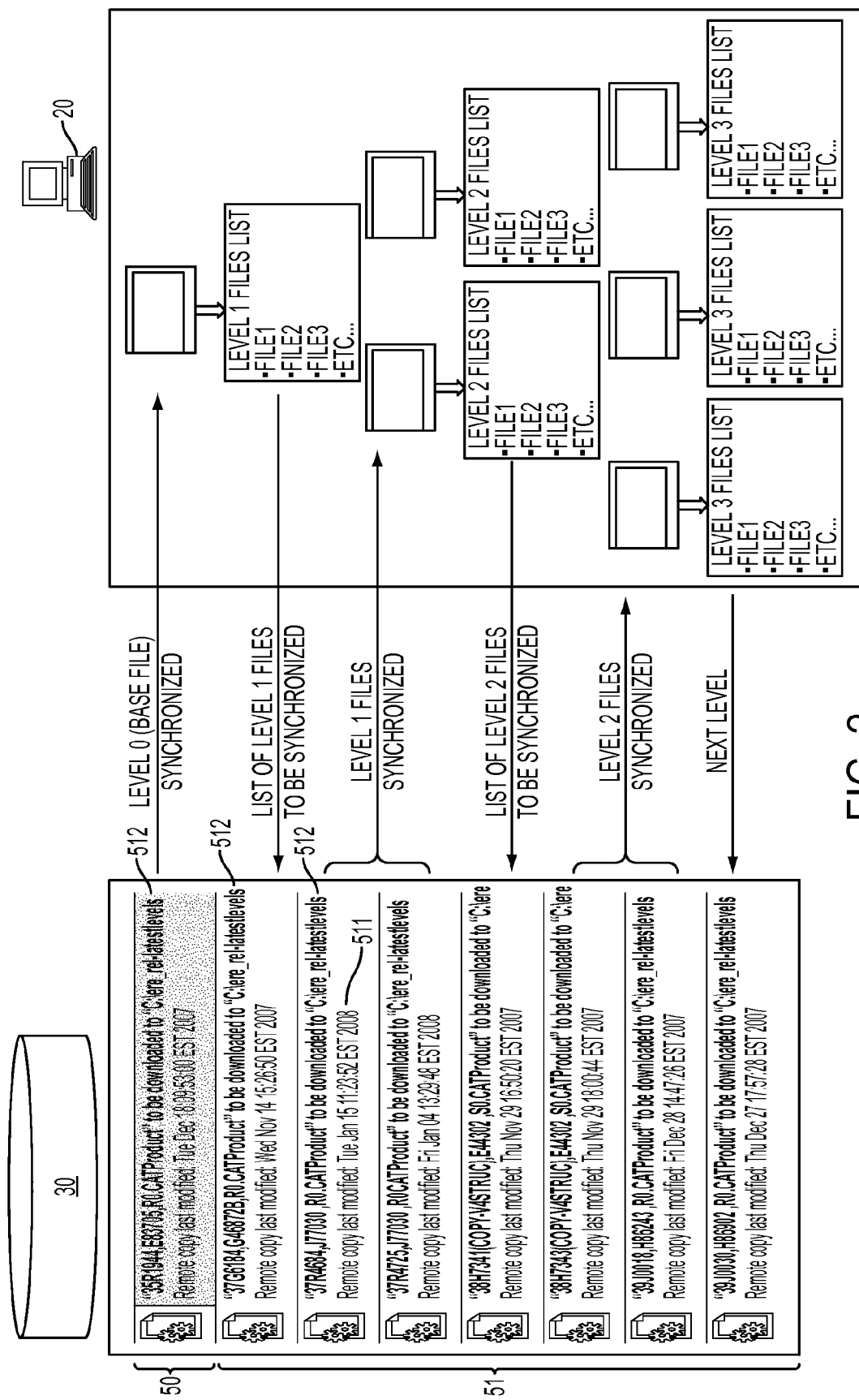
FIG. 2 is a diagram illustrating a file hierarchy.
Figure 3:
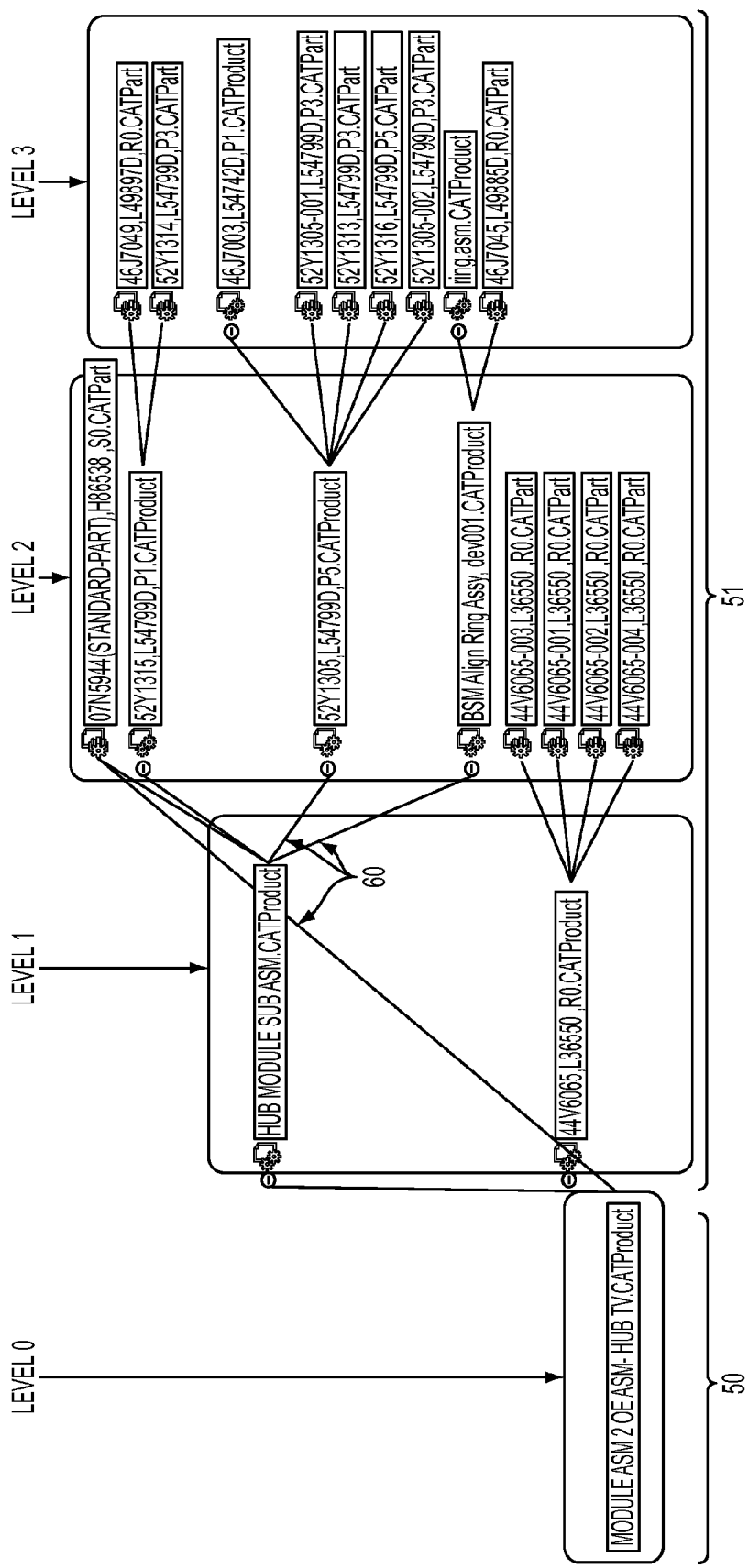
FIG. 3 is a diagram illustrating links between files in the file hierarchy.

With reference to FIGS. 2 and 3, an assembly file 50 is stored at the remote computing device 20 and has a set of sub-assembly files 51 linked thereto. For the MCAD data example, the assembly file 50 may relate to an MCAD assembly and each sub-assembly file 51 may be a file or set of files relating to a particular part or component of the MCAD assembly. Thus, one or more of the sub-assembly files 51 may be linked to the assembly file 50 as a whole and one or more of the sub-assembly files 51 may be linked to one another. Such links 60 are illustrated schematically in FIGS. 2 and 3 whereby level 0 data identifies the assembly file 50 (i.e., the MCAD assembly), level 1 data are sub-assembly files 51 that may relate to comprehensive aspects of the MCAD data assembly, level 2 data are additional sub-assembly files 51 that may relate to intermediate level aspects of the MCAD assembly and level 3 data are additional sub-assembly files 51 that may relate to detail level aspects of the MCAD assembly. The illustration of the links 60 in FIG. 3 indicates that files within levels 0, 1, 2 and 3 may be related to one another such that they form a family of files that should be downloaded, copied, synchronized or worked on together.

With reference back to FIG. 1, the local device 30 includes a tangible storage medium 31, which includes memory units 310, 311 and which is readable by a processing circuit 32. Memory unit 310 may be embodied as a cache memory and memory unit 311 may be embodied as read-only memory (ROM). Executable instructions are stored on the tangible storage medium 31 at the memory unit 311 for execution of a method by the processing circuit 32. In accordance with embodiments of the invention and, with reference to FIG. 4, the method includes receiving a command relating to an assembly file 50 (i.e., an MCAD assembly file) stored at a remote location, such as the remote device 20 (operation 400) and, upon receipt of this command, synchronizing the assembly file 50 between the remote device 20 and the local device 30 (operation 410). At this point, since the assembly file 50 may be a level 0 file, level 0 data is synchronized between the remote device 20 and the local device 30 such that the processing circuit 32 of the local device 30 will be able to identify links between the assembly file 50 and sub-assembly files 51 in the level 1 data at the remote device 20.

The processing circuit 32 will then determine (operation 420) whether a list of the sub-assembly files 51 in the level 1 data, which are linked to the assembly file 50, exists or is stored in a storage unit or database of the local device 30. In accordance with embodiments, this database may be stored in the cache memory of the memory unit 310. In an event that the list is stored in the local device 30, the method proceeds by the processing circuit 32 synchronizing the data of the sub-assembly files 51 included in the list between the remote location 20 and the local device 30 (operation 430). That is, if the user of the local device 30 has most recently worked on certain sub-assembly files 51 in the level 1 data of the assembly file 50, then the sub-assembly files 51 in the level 1 data that the user accessed will be listed in the cache memory of the memory unit 310. By relying on this listing, the synchronization of only the listed sub-assembly files 51 can be conducted with a limited drain/demand on network resources. This is due to the fact that only the asynchronicities between the data of the sub-assembly files 51 at the remote device 20, which are being synchronized, and the data of the sub-assembly files 51 at the local device 30, will actually be transferred across the network 40. In an exemplary case, if a single 1 GB sub-assembly file 51 is included in the list, but the asynchronicities between the data of the sub-assembly file 51 at the remote device 20 and the data of the sub-assembly file 51 at the local device 30 are minor and only 1 MB in size, only the 1 MB asynchronicities are transferred.

Figure 4:
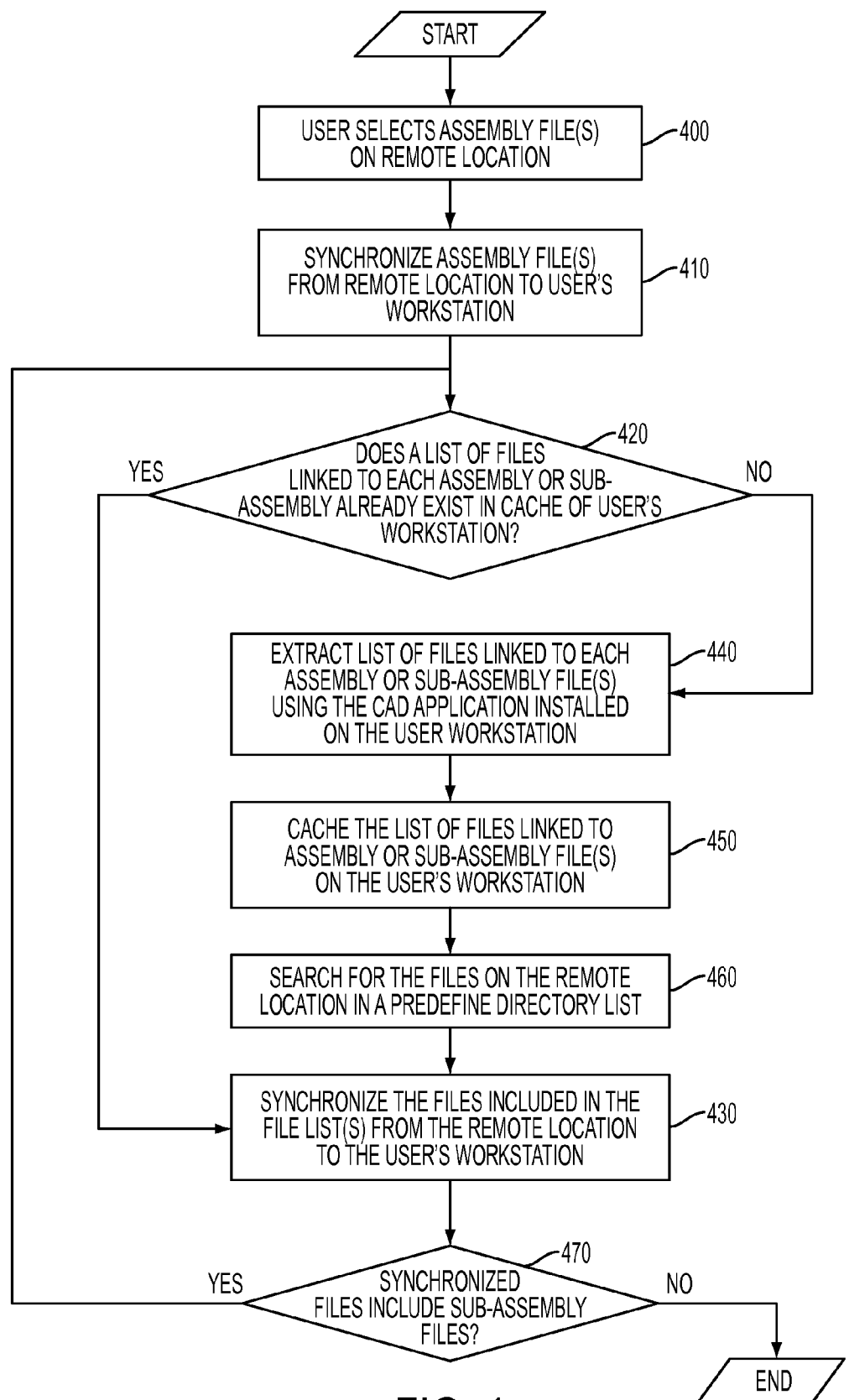
FIG. 4 is a flow diagram illustrating a method of data synchronization.

Still referring to FIG. 4, where the list is not stored in the local device 30, the method further includes the processing circuit 32 extracting the list from the remote device 20 (operation 440), storing or generating the list in the storage unit or database of the local device (operation 450) and searching for the files included in the list at the remote device 20 (operation 460). The searching of operation 460 is executed with respect to a predefined directory at the remote location to save searching time at the remote device 20. Once the searching is complete, control proceeds to operation 430 whereby the data of the sub-assembly files 51 included in the list are synchronized between the remote location 20 and the local device 30.

The method may further include the processing circuit 32 determining whether any of the sub-assembly files 51 included in the list also have associated links to additional sub-assembly files 51 at the 1, 2 or 3 data level (operation 470). If not, the method ends. If, however, links to additional sub-assembly files 51 exist, the method proceeds to operation 420 whereby the processing circuit 32 determines whether a list of the additional files is stored or exists in the storage unit or database of the local device 30. If the list of the additional sub-assembly files 51 is stored, the additional files included in the list will be synchronized between the remote device 20 and the local device 30.

As above, in an event the list of the additional files is not stored in the local device, the list of the additional files is extracted (operation 440), the list of the additional files in the database is stored or generated in the storage unit or database of the local device (operation 450) and the additional files included in the list are searched for at the remote location (operation 460). Again, the searching is executed with respect to a predefined directory at the remote device 20.

As described herein, the synchronization between the remote device 20 and the local device 30 is conducted such that asynchronicities between data represented by or stored under the file 50/sub-assembly files 51 are corrected. This can be accomplished in multiple ways. As an example, the processing circuit 32 of the local device 30 could examine a time stamp 511 (see FIG. 2) associated with each individual data element 512 of each sub-assembly file 51 at the remote device 20 that is to be synchronized. The data element 512 refers to the actual data represented by or stored under the file 50/sub-assembly file 51. The local device 30 could then compare this time stamp 511 with a corresponding local time stamp to ascertain whether the individual data element 512 represents an updated version relative to a locally stored version of the data element. If the individual data element 512 does represent such an updated version, the locally stored version of the individual data element is overwritten. If, on the other hand, the individual data element 512 does not represent such an updated version, the locally stored version of the individual data element is determined to be the newer version and is left in tact by default.

In accordance with embodiments, the executable instructions stored on the tangible storage medium 31 at the memory unit 311 instruct the processing circuit 32 of the local device 30 to identify and examine the time stamp 511 at the remote device 20. In accordance with further embodiments, the time stamp 511 may be provided along with, instead of or replaced by other identification data.

Figure 5:
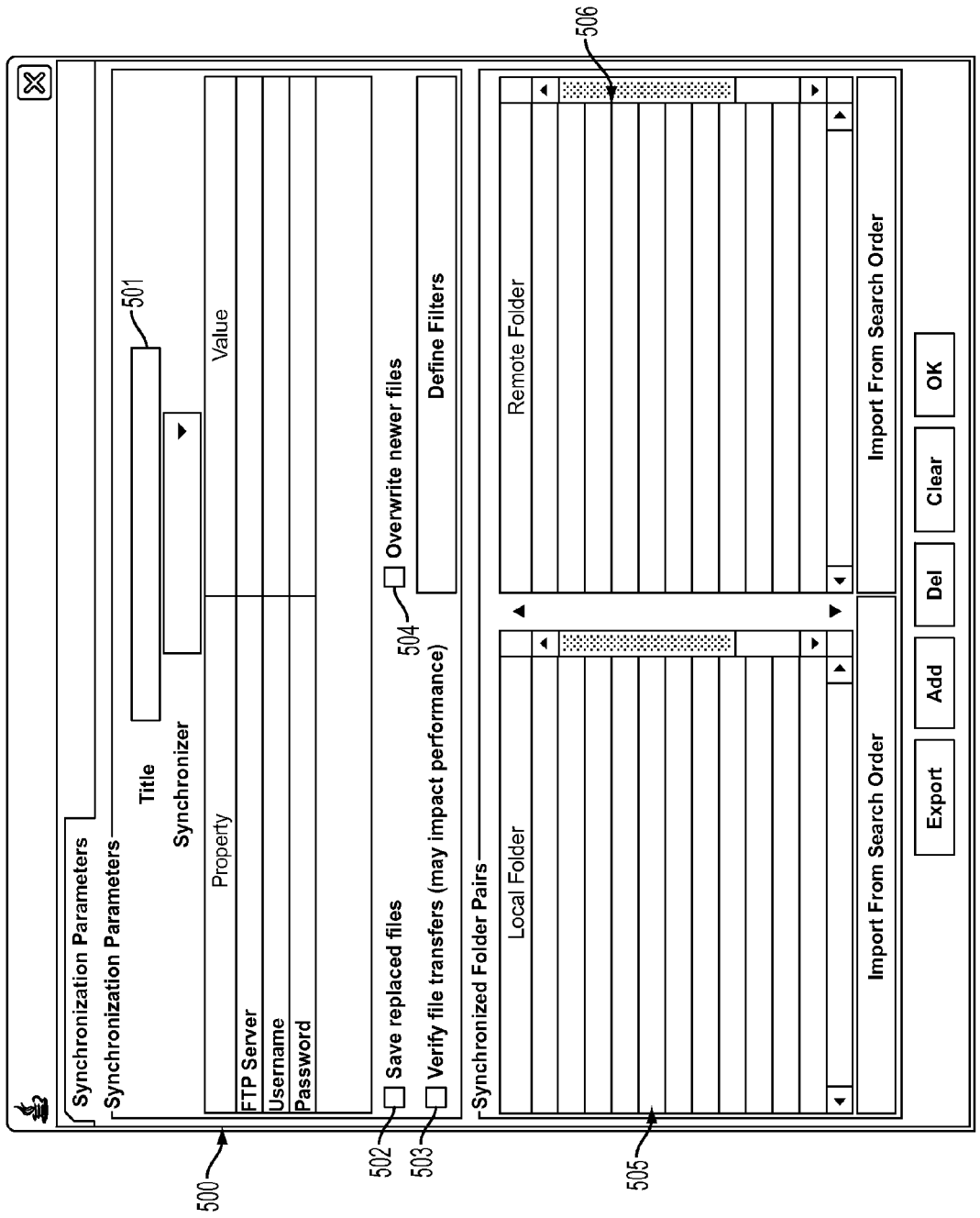
FIG. 5 is an illustration of an exemplary graphical user interface (GUI) in accordance with embodiments.

With reference to FIG. 5, an illustration of an exemplary graphical user interface (GUI) 500 is provided in accordance with embodiments of the invention. As shown in FIG. 5, the assembly file 50 may be identified in name field 501, a save button 502 is provided for instructing the local device 30 to save replaced files or data, a verification button 503 is provided to issue a notice that a file transfer has been verified and an overwrite button 504 is provided to overwrite newer data or files. For the overwrite button 504, the default case is that newer data or files stored on the local device 30 will be left intact so it is necessary for the user to specifically instruct the local device 30 to proceed with overwriting. A warning message may also be provided to verify that the overwrite button 504 is indeed supposed to have been actuated. The GUI 500 further includes local folder listings 505 where the data and files stored locally are listed and remote device folder listings 506 where the data and files stored remotely are listed.

Technical effects and benefits of the present invention include a proposed solution to reduce network traffic by minimizing data transferred at each update, therefore leading to energy efficiency, and by eliminating a manual process of gathering and duplicating all the files needed for an assembly before being copied with a standard synchronizer or file transfer program (ftp). The proposed method will save a significant percentage on the initial transfer and then an even greater percentage will be saved on subsequent data transfers depending on the number the designers and the number of modifications. The turn around time will also will decease significantly for every update.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
upon receipt of a command relating to a file stored at a remote location, synchronizing the file between the remote location and a local device via a network;
determining whether a list of files linked to the file is stored in the local device, determining whether any of the files included in the list include additional files and determining whether a list of the additional files is stored in the local device; and,
in an event the list and the list of the additional files are stored in the local device, synchronizing only data asynchronicities between the files and the additional files included in the list between the remote location and the local device such that only the data asynchronicities are transferred via the network from the remote location to the local device,
the synchronizing comprising generating a graphical user interface (GUI) identifying the file, providing a save button for instructing the local device to save replaced files or data, a verification button to issue a notice that a file transfer has been verified and an overwrite button to overwrite newer data or files, and displaying side-by-side local and remote listings for the list and the list of the additional files, and
wherein the file comprises a computer aided design (CAD) data assembly file and the files linked to the file comprise:
sub-assembly files relating to comprehensive aspects of the CAD data assembly;
first additional sub-assembly files linked to the sub-assembly files and relating to intermediate level aspects of the CAD data assembly; and
second additional sub-assembly files linked to the first sub-assembly files and relating to detail level aspects of the CAD data assembly,
the file, the sub-assembly files and the first and second additional sub-assembly files forming a family of files to be manipulated together.

2. The method according to claim 1, wherein the method further comprises:
in an event the list is not stored in the local device, extracting the list;
storing the list in the local device; and
searching for the files included in the list at the remote location.

3. The method according to claim 2, wherein the searching is executed in a predefined directory at the remote location.

4. The method according to claim 1, wherein the method further comprises:
in an event the list of the additional files is not stored in the local device, extracting the list of additional files;
storing the list of the additional files in the local device; and
searching for the additional files included in the list of the additional files at the remote location.

5. The method according to claim 4, wherein the searching is executed in a predefined directory at the remote location.

6. A method comprising:
receiving a command relating to a file stored at a remote location and synchronizing the file between the remote location and a local device via a network;
determining whether a list of files linked to the file is stored locally, determining whether any of the files included in the list include additional files and determining whether a list of the additional files is stored in the local device;
synchronizing only data asynchronicities between the files and the additional files included in the list between the remote location and the local device by only transferring the data asynchronicities via the network, in an event the list and the list of the additional files are stored locally; and
generating a graphical user interface (GUI) identifying the file, providing a save button for instructing the local device to save replaced files or data, a verification button to issue a notice that a file transfer has been verified and an overwrite button to overwrite newer data or files, and displaying side-by-side local and remote listings for the list and the list of the additional files.

* * * * *